May 3, 1949.  H. T. AVERY  2,468,913
AIRPLANE AND HELICOPTER SUSTAINED AIRCRAFT
Filed Nov. 22, 1943  3 Sheets-Sheet 1
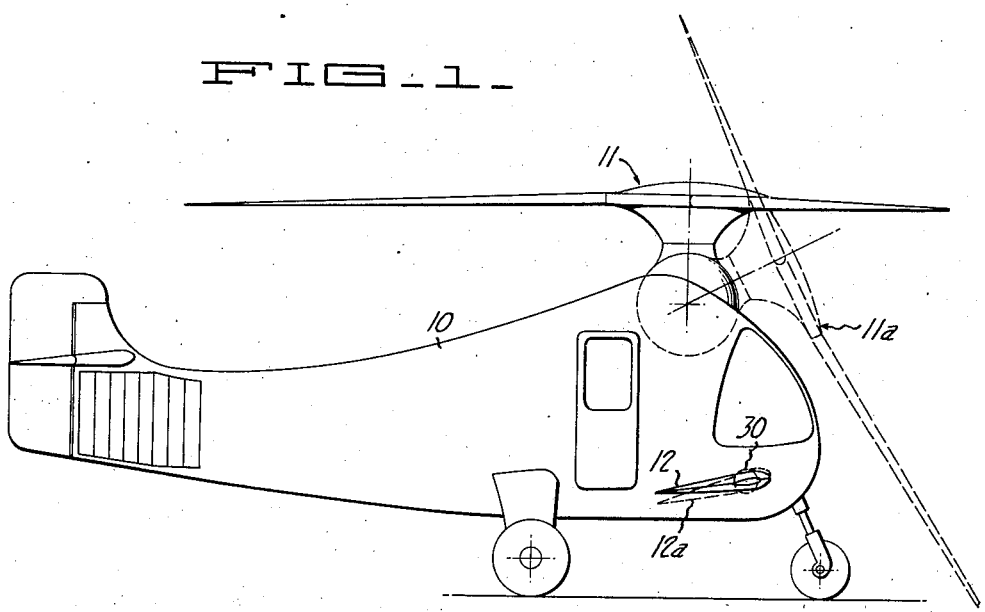
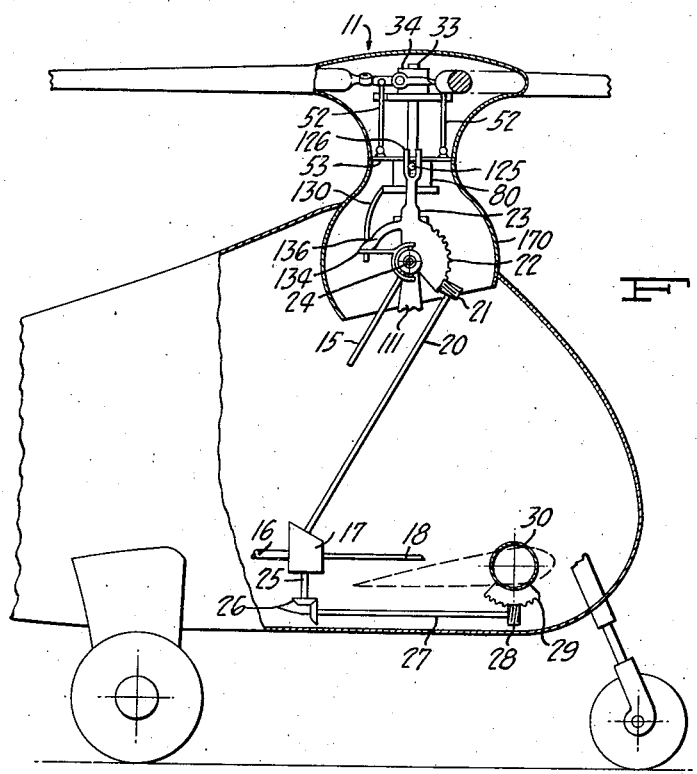
INVENTOR
Harold T. Avery
BY
ATTORNEYS

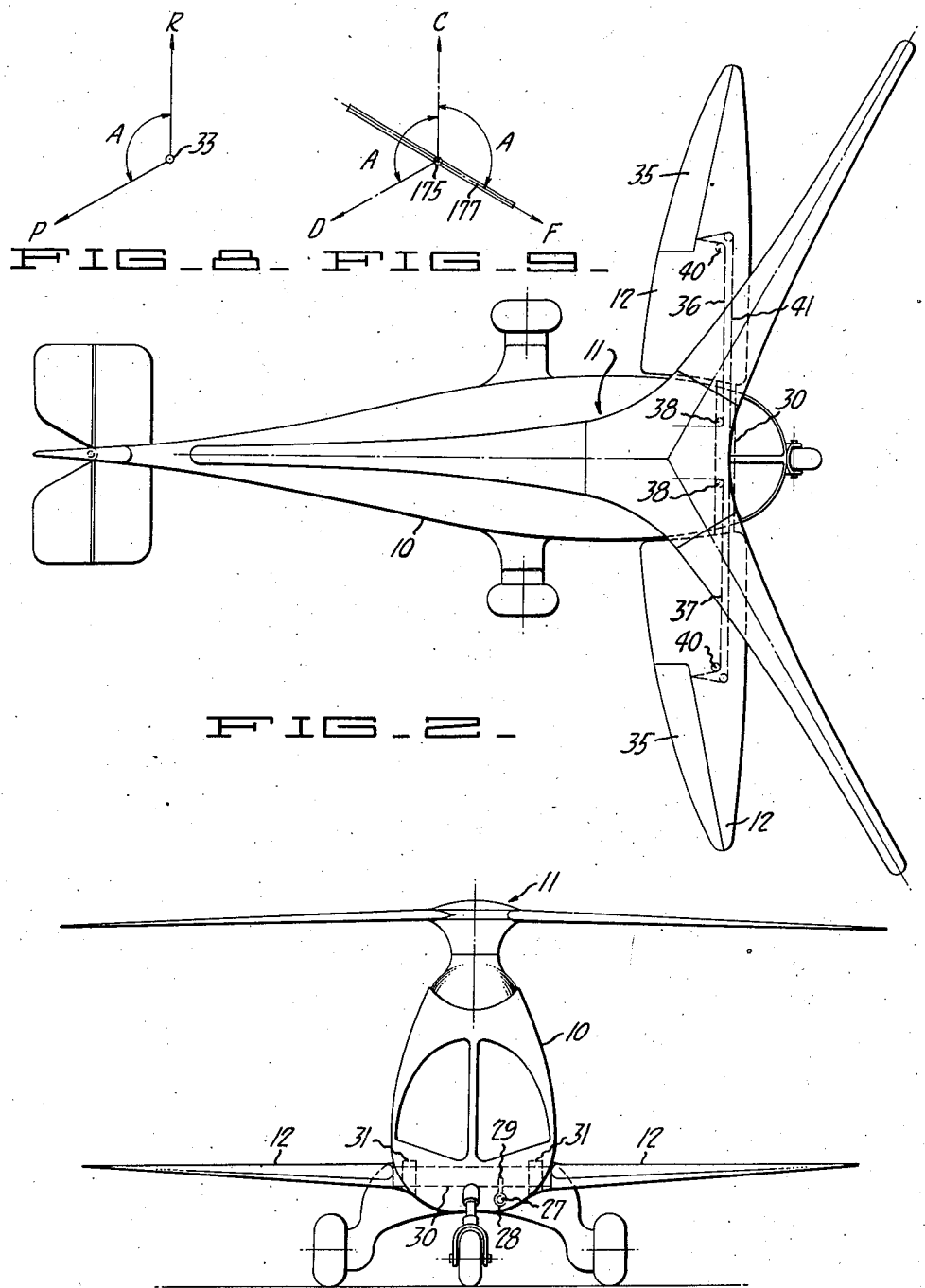

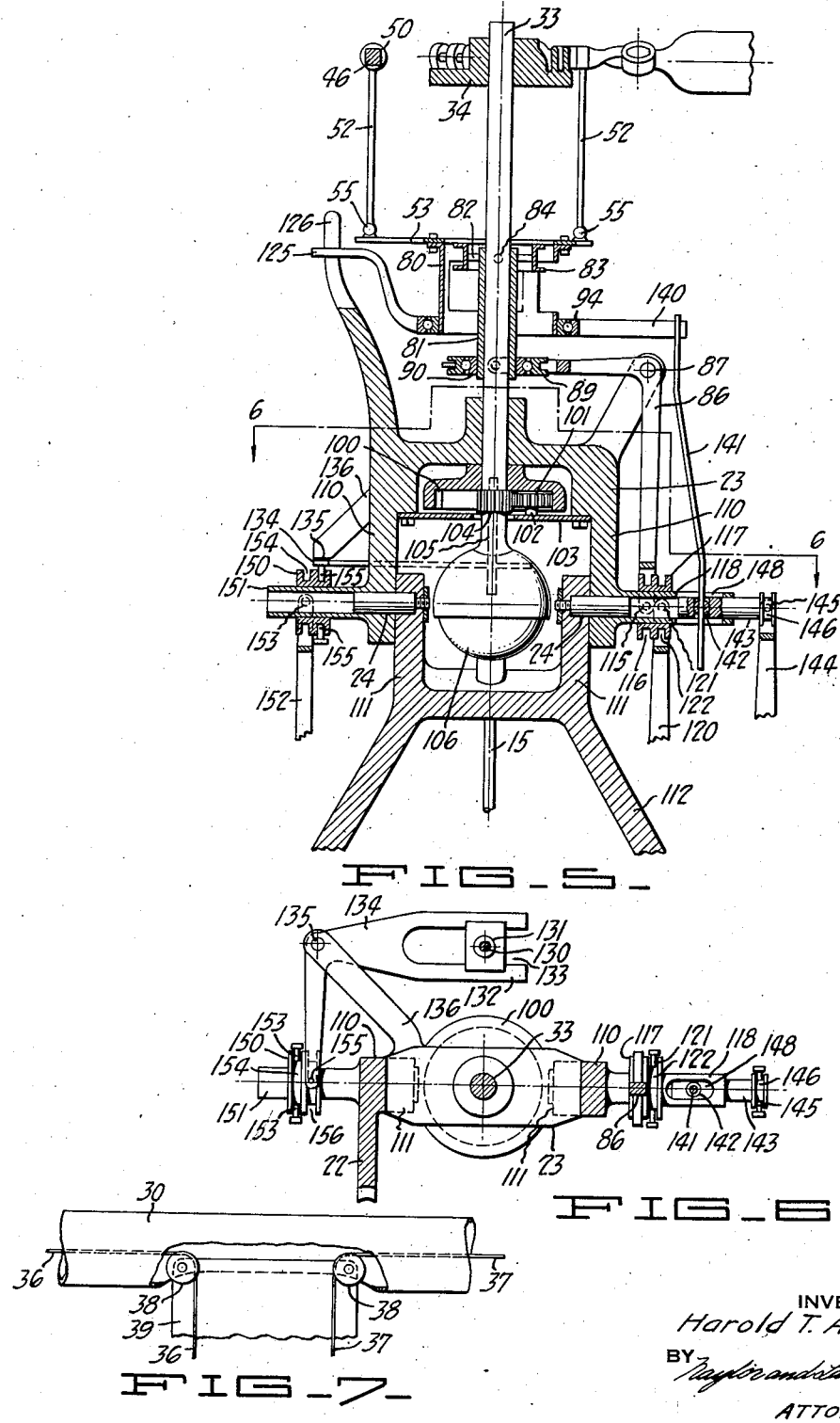

Patented May 3, 1949

2,468,913

UNITED STATES PATENT OFFICE 2,468,913

AIRPLANE AND HELICOPTER SUSTAINED AIRCRAFT

Harold T. Avery, Oakland, Calif.

Application November 22, 1943, Serial No. 511,304

7 Claims. (Cl. 244—7)

The present invention relates to aircraft and more particularly to a novel type of aircraft capable of sustentation and/or vertical propulsion by rotating wings, or alternatively capable of sustentation by means of the character of fixed wings; and embodying an airscrew susceptible of employment either as a rotating wing means for sustentation and/or vertical propulsion, or as a forward propulsion means cooperating with fixed wings.

The cruising speed and efficiency of modern fixed wing aircraft is limited by at least two important considerations; the necessity for providing wings larger than necessary to support the craft at cruising speeds in order to make it possible for the craft to take off and land at speeds substantially below cruising speeds, and the necessity for employing propelling airscrews of an effective diameter substantially less than would be ideal were it not for the physical limitations imposed by the mounting of an airscrew rotating in a vertical plane on such craft; it being evident that the radius of the airscrew cannot in any event exceed the vertical dimension of the craft and must in most instances be substantially less than such vertical dimension.

In the ordinary airplane the wing area is determined primarily by take-off and landing conditions, for the wing area must be sufficient so that at a reasonable landing speed the maximum lift coefficient of the wing airfoil will produce a lift at least equal to the weight of the craft. At cruising speed the wing operates at a good deal lower angle of attack so as to bring into effect a lift coefficient enough lower to produce the same lift at the very much higher speed involved. Since cruising preferably takes place at the angle of attack which produces maximum lift/drag ratio at which angle of attack the lift coefficient for a given airfoil bears a fixed ratio to the maximum lift coefficient of the airfoil, which determines landing speed, it follows that for each airfoil the most economical cruising speed bears a fixed ratio to landing speed. Were it not for this limitation the most economical cruising speed could be made very much larger than is ordinarily the case, by providing very much smaller wings, for when operating at the angle of attack giving maximum lift/drag ratio the smaller wings would produce the same lift for the same drag as the larger wings, but would do so at very much higher speed.

One of the most important energy losses in connection with the ordinary propeller is that of the kinetic energy of the slipstream which loss is proportional to the mass per unit of time times the square of the velocity increment imparted to the stream by the airscrew. Since the thrust created is proportional to the same mass times the first power of this same velocity increment, it is evident that any given thrust can be more efficiently obtained by increasing the mass of air handled and cutting down the velocity increment required, or in other words by increasing the diameter of the airscrew. The physical limitations hereinbefore referred to usually prevent carrying this very far however.

On the other hand, the cruising speed of modern rotating wing aircraft is limited by other important considerations to speeds much lower than maximum fixed wing airplane speeds. It is well understood that the maximum forward speeds of autogyros, helicopters or helicogyros must be such that the maximum tip velocity of the advancing airfoil relative to the surrounding air will not substantially exceed the speed of sound, various theories having been advanced to account for the undesirable phenomena occurring at super-sonic airfoil speeds. This and other limiting considerations are such that the technical literature has not described any rotating wing aircraft capable of a speed exceeding approximately 150 miles per hour, and it is not probable that speeds of the order of 300 miles per hour will ever be exceeded by such craft.

A primary object of the present invention is to provide an aircraft having the desirable take-off, landing and hovering performance of the helicopter, but free from the speed limitations heretofore imposed upon such craft.

A further primary object of the invention is to provide an aircraft capable of sustentation by means of the character of fixed wings, in which craft the wing area may be ideally proportioned to attain maximum cruising speed and efficiency without reference to the take-off and/or landing speed of the craft.

A further important object of the invention is to make possible the employment in aircraft of the fixed wing type of propellers of any desired effective diameter without reference to the vertical dimensions of the craft.

In general terms, the foregoing objects are accomplished, according to the present invention, by the employment of a power driven airscrew which is susceptible of adjustment with respect to the craft from a take-off, hovering and landing attitude, in which the principal component of thrust exerted by it upon the craft is substantially vertical, to a cruising attitude, in which the principle component of thrust exerted by it upon the craft is more nearly horizontal than vertical, and by utilizing wings or the like as the principal or even the sole source of lift when the airscrew is disposed in its cruising attitude. Economical cruising speed is made very much higher than in conventional airplanes by employing very much smaller wings capable of supporting the craft only at speeds very much higher than any speeds desirable for take-off or landing.

For the purpose of providing a practical embodiment of a craft of this character, further and more specific objects of the invention are to make it possible to change the pitch of the airscrew blades either cyclically or simultaneously by control means disposed within the craft and not affected by adjustment of the airscrew as a whole between its two attitudes above described, and also to make it possible to automatically coordinate adjustment of the angle of incidence of the wings with the changes in the attitude of the airscrew above described.

The foregoing together with other objects and advantages of the invention will be best understood from the following description of an aircraft embodying the same, reference being had to the accompanying drawings, in which:

Figure 1 is a right side view of a craft embodying my invention;

Figure 2 is a plan view of the same craft;

Figure 3 is a front elevation of the same craft;

Figure 4 is a view similar to Figure 1, but with the outer shell of the craft broken away sufficiently to show certain of the internal mechanisms relating to the invention;

Figure 5 is a front elevation showing on an enlarged scale the hub of the airscrew with which my craft is equipped and the supporting, adjusting, controlling, and driving mechanisms therefor;

Figure 6 is a partial plan view taken on section line 6—6 of Figure 5;

Figure 7 is a partial plan view of the structure for supporting the wings and for controlling the ailerons thereon;

Figure 8 is a diagram relating to control movements applied in the vicinity of the rotor hub; and Figure 9 is a similar diagram relating to the corresponding control movements in the vicinity of the control stick.

As illustrated in Figures 1, 2 and 3 the craft of the present invention comprises a fuselage 10, an airscrew 11, preferably of the articulated blade type as is generally well known in the lifting rotors of rotating wing aircraft, and two semi-wings 12. As indicated in Figure 1 the airscrew 11 is tiltable from the position shown in solid lines forward to the position 11a shown in dotted lines, and the semi-wings 12 are preferably adjustable in incidence from the solid line position to the dotted line position 12a.

The present craft is equipped with a prime mover, power transmission mechanism and rotor torque counterbalancing, and control mechanism generally similar to any selected one of the various forms of such mechanism disclosed in my copending applications Serial Number 402,283, filed July 14, 1941, now Pat. No. 2,369,652, Feb. 20, 1945 and Serial Number 439,963, now abandoned, filed April 22, 1942, while the airscrew and its blade adjusting mechanism may be generally similar (except for certain detailed differences herein fully disclosed) to the airscrew and corresponding mechanism disclosed in my copending application Serial Number 505,636, filed October 9, 1943.

As disclosed in the copending applications referred to, the engine (not shown in the accompanying drawings) is fixed in the fuselage 10 and through a manually controlled clutch and a free-wheeling clutch (not shown) normally drives during flight a power transmission shaft 15 (Figure 4) which as hereinafter described drives the airscrew 11. The engine also constantly rotates during its operation a power shaft 16 which leads to a reverse clutch box 17 which houses a reverse clutch, capable of clutching the driving shaft 16 to driven mechanism hereinafter described for the purpose of selectively driving said mechanism in either of two opposite directions; said shaft 16 being normally declutched from such mechanism. The reverse clutch may be of any well known type capable of performing as described under the control of control rod 18 leading from the pilot's compartment to the reverse clutch box 17. Control rod 18 may be normally centered and capable of being rocked by the pilot either way from its centered position to effect engagement of the reverse clutch for a direction of operation corresponding to the direction of rock. The mechanism driven by the reverse clutch in box 17 includes a shaft 20 integral with worm 21 which meshes with worm segment 22 integral with airscrew yoke 23 (Figures 4 and 5), whereby rotation of shaft 20 in one direction or the other will serve to angularly displace the entire airscrew including its hub and related structure about transverse pivot pins 24.

The mechanism driven by the reverse clutch in box 17 may also include shaft 25 (Figure 4), which through bevel gears 26 drives shaft 27 integral with worm 28, meshing with worm segment 29 integral with tube 30 which tube is also integral with the two semi-wings 12, and is rockable in bearings 31 fixed in the fuselage (see Figure 3). The gear ratios and worm pitches are preferably such that tube 30 is rotated through much less of an angle than is the airscrew yoke 23 in accordance with the smaller angular displacement indicated between the solid and dotted line positions for the semi-wings 12 as compared with that indicated for the airscrew 11 in Figure 1. Alternatively separate reverse clutches and separate controls may be provided for rocking airscrew yoke 23 and tube 30. In any case a limit stop operated by the rocked member may be provided to disengage the clutch when the desired maximum limit of angular rock has been reached, and indicator mechanism may be provided to indicate to the pilot the current degree of the angular rock, all as well known in the art in connection with the power rocking or traversing of various kinds of mechanisms.

Semi-wings 12 are preferably provided with ailerons 35, differentially rockable in the manner well known in the art through the application of a rearward pull on either cord 36 or cord 37 (Figures 2 and 7). Cords 36 and 37 are led to the left and right ailerons respectively by passing around pulleys 38 mounted on fuselage frame member 39 which extends into the tube through an opening in the rear face of the tube, but is not attached to the tube. In the vicinity of their respective ailerons, cords 36 and 37 are each led over a pulley 40 mounted within the structure of each semi-wing. A return cord 41 passing over pulleys mounted within the structure of the semi-wings constitutes the well known interconnection between the two ailerons. By so arranging it that cord 36 and cord 37 in passing from pulley 38 to pulley 40 extend along the center line of tube 30, and by providing a large enough opening in the rear face of tube 30 so that frame member 39 and pulleys 38 do not interfere with the tube in any rocked position thereof, the aileron control may be carried from control members in the fuselage to the ailerons mounted on the semi-wings which are angularly displaceable relative to the fuselage, without the displacement of the ailerons relative to the wings being in any way affected by the displacement of the wings relative to the fuselage, and without any interruption of control of the ailerons from within the fuselage on account of wing displacement.

The construction of the mechanisms for supporting, adjusting, and driving the airscrew is shown in Figures 4, 5, and 6. As in the copending application Serial Number 505,636, previously referred to the airscrew is driven by rotating a shaft 33, integral with which is a hub 34 to which the airscrew blades are hinged. In the present craft the shaft 33 is rotatably supported in a yoke member 23 and, at its lower end, is integral with internal gear 100 which is driven by one or more planetary pinions 101 each pivotally mounted on a stud 102 integral with a plate 103 which is fixedly attached to the yoke member 23. Pinions 101 are in turn driven by a sun gear 104 integral with a separate shaft 105 which is the driven shaft of a universal joint 106 of which the power driven shaft 15, previously described, is the driving shaft. Universal joint 106 may be of any well known type but is preferably one designed to produce angular advance of the driven member always equal to that of the driving member. By disposing shaft 15 (as indicated in Figure 4) so that it slants forward from the vertical at an angular inclination approximately midway between the angular positions that shaft 33 is capable of assuming at the extreme limits of the angular tilting range of airscrew 11, the maximum angle through which the universal joint 106 must be deflected from a straight alignment of driving and driven shafts is minimized. By arranging the gear reduction from gear 104 to gear 100 on the side of the universal joint 106 remote from the prime mover, the torque loads on universal joint 106 and on shafts 15 and 105 are minimized.

To provide for angular displacement of the axis of the airscrew 11, the yoke member 23 which supports the shaft 33 has extending downwardly from the main upper portion thereof two arms 110, arranged to pivotally fit over two pins 24 carried by arms 111 of a fuselage frame member 112 as shown in Figure 5. The universal joint 106 is centered on the axis of pins 24. The rocking of yoke 23, and with it the rocking of the entire airscrew 11, on pivot pins 24 is accomplished through power drive applied to segment 22 which is integral with yoke 23 as indicated in Figures 4 and 6.

As set forth in copending application Serial Number 505,636 the pitch of the blades of the airscrew 11 is adjusted by the movement of links 52 (Figure 5) in a direction essentially parallel to shaft 33, there being one link 52 for each blade, the moving of which upward as viewed in Figure 5 increases the pitch of the blade while moving downward decreases it. Each link 52 is connected by a ball and socket joint 55 to a common control plate 53 integral with a cylindrical frame 80 which through mutually perpendicular pins 82 and 84 is supported by but universally rockable relative to a sleeve 81 vertically slidable upon shaft 33. By raising sleeve 81 all of the links 52 will be simultaneously raised and the pitch of all blades increased, and vice versa.

The raising and lowering of sleeve 81 to exercise such control is accomplished through a bell crank 86 pivotally mounted on a stud 87 carried by the yoke 23. The inner end of the upper arm of the bell crank 86 forms a yoke supporting pins which engage in an external groove on the outer race 89 of a ball bearing, the inner race 90 of which is integral with the sleeve 81. The lower end of the lower arm of bell crank 86 also forms a yoke supporting pins 115 which engage in a circumferential groove 116 of a short sleeve 117 laterally slidable on a tube 118 concentric with the pin 24 and fixed to or integral with the yoke 23. The lateral position of sleeve 117 and consequently the rocked position of bell crank 86 and the average blade pitch is determined by a lever 120 the upper end of which terminates in a yoke supporting pins 121 which engage in a second circumferential groove 122 in sleeve 117.

As more fully described in copending application Serial Number 505,636, cyclic control of blade pitch (which is utilized to control and effect horizontal displacements of the craft when the airscrew is operating in its "helicopter" attitude) is effected by appropriate tilting of the cylindrical frame 80 to which the plate 53 carrying the links 52 is integrally assembled. This tilting may take place in any direction about the center of universal support of frame 80 which is located at the intersection of the axes of pins 82 and 84, and is effected and controlled by applying appropriate displacements to the outer race 94 of a ball bearing, the inner race of which is integral with frame 80. In order to prevent rotation of the race 94 with the airscrew an arm 125 is provided which is integral with the race and includes an outer portion extending radially outward from, the universal pivotal center of frame 80 at a height normally about the same as that of the pivotal center. This outer portion of arm 125 is guided in fork 126 integral with the yoke 23 (see also Figure 4).

Also integral with race 94 is an arm 130 (Figure 4), which extends downwardly and passes freely through a mating hole in a ball 131 (Figure 6) freely supported in a mating socket on a plate 132 slidably guided in a forked opening 133 in a bell crank 134 pivotally mounted at 135 on an arm 136 integral with the yoke 23. As illustrated in Figure 5 a third arm 140 is also integral with race 94 and extends radially out therefrom at a point 90° from arm 130. An arm 141 is pivotally attached to the outer end of arm 140 so as to be freely displaceable about the longitudinal axis of the arm 140 but not otherwise displaceable relative thereto. Arm 141 extends freely through a mating hole in a ball 142 fitting freely in a normally vertical hole in a pin 143 longitudinally slidable in the tube 118 previously described. The sliding of this pin within the tube 118 is effected and controlled through a lever 144 terminating upwardly in a yoke supporting two pins 145 which rest in a circumferential groove 146 in the outer end of the pin (see also Figure 6). In order that tube 118 will not interfere with the movements of arm 141 large slots 148 are provided in the top and bottom faces of the tube 118. This arrangement is such that in and out movement of pin 143, effected by control lever 144, will cause a lateral tilting of cylinder 80 on its universal pivot, for the guidance supplied by forks 126 and 133 will prevent other than an essentially lateral tilting, except in response to the rocking of bell crank 134. However, regardless of whether or not any lateral tilting is present tilting in an essentially longitudinal direction may be effected by the rocking of the bell crank 134. Since for any given position of lever 144 and pin 143, arm 125 will be held in substantially a fixed location in fork 126, displacement of bell crank 134 will rock frame 80 about an axis passing through the center of arm 125 at its current location in fork 126 and through the universal pivotal center of frame 80, which constitutes essentially a transverse axis. The rocking of bell crank 134 to effect rocking about such an axis is effected and controlled by the sliding of a sleeve 150 on a tube 151 corresponding to the previously described opposite tube 118. The sliding of the sleeve 150 is controlled by a lever 152 which terminates upwardly in a yoke supporting two pins 153 which rest in a circumferential groove 154 in the sleeve 150, while pins 155 integral with the bell crank 134 rest in another circumferential groove 156 in said sleeve.

Tilting of the control plate 53, in any desired direction, can of course be brought about by introducing the appropriate components of tilt in the two mutually perpendicular directions controlled by levers 144 and 152. Cyclic pitch change in rotating wing aircraft rotors is usually effected by a universally movable control stick connected with one set of linkages operable by lateral displacement of the stick and to another set operable by longitudinal displacement thereof, which linkages are so connected to the pitch control mechanism that the operation of the former set results in changes of the flapping angles of the blades in such a manner as to constitute a lateral tilt of the effective plane of rotation of the rotor, and that the operation of the latter set results in changes of the flapping angles of the blades so arranged as to constitute a longitudinal tilt thereof. In the present instance it may not prove feasible to connect two such sets of linkages directly to the respective control levers 144 and 152, for the direction of tilt of the control plate 53 required to produce flapping angle changes constituting lateral and longitudinal rotor tilts, respectively, may be at odd angles to the main axes of the craft. In some embodiments it may prove feasible to so locate links 52 that the direction of tilt of plate 53 will coincide with or depart by an even multiple of 90° from the related direction of tilt of the rotor in which case connecting the customary control stick linkages directly to levers 144 and 152 will provide suitable control, but such relationship is not necessary for by mounting the two sets of linkages at their points of connection to the control stick at such an angle to the center line of the craft that they will respond respectively to control stick movements in two mutually perpendicular directions displaced through the same angle relative to craft centerline as the angle subtended between the direction of tilt of plate 53 and the resultant direction of effective tilt of the rotor, the tilt of plate 53 may be made to take place in such a direction that the resulting effective tilt of the rotor will be in the same direction as that of the control stick.

For instance, referring to Figure 8 the rotor construction may be such that plate 53 has to be tilted in the direction P to produce an effective rotor tilt in the direction R advanced through the angle A from the direction P. Then the member 177 (Figure 9) which is adapted to receive and transmit control movement of the control stick 175 in the direction F (which may in the case of the ordinary airplane control stick coincide with the forward centerline C of the craft) is placed at the angle A to such centerline, so that actual movement of the control stick in the direction C will produce the same responses of the respective control linkages that would in the case of the ordinary airplane arrangement (in which the linkage center line F coincides with craft center line C) be produced by displacement of the control stick in the direction D, leading direction C by the angle A. With such an orientation of the control linkage relative to the control stick, the movements of linkage F and the linkage responsive to control stick movement perpendicular to direction F may be carried respectively to levers 152 and 144, and plate 53 will be tilted in such a direction as to produce effective rotor tilt in a direction corresponding to the displacement of control stick 175.

In other words, the member 177 (which corresponds to one of the two coordinate control members which are responsive to mutually perpendicular movements of the control stick in the control arrangements well known in airplanes) is so disposed relative to the control stick 175 as to be responsive to the component of the movement of the control stick in the direction F, which is the direction of response of the rotor system to tilt of the control plate 53 in the direction C, longitudinal of the craft and the direction in which member 152 (one of the two cyclic control members) is adapted to tilt the plate 53. Member 144 (the other of the two cyclic control members) is adapted to tilt the plate 53 transversely of the craft and to thereby produce a rotor response in a direction perpendicular to F (Fig. 9). Then by having member 144 connected to the other coordinate control member, which is responsive to movement of the control stick 175 in a direction perpendicular to F, the response of the rotor will always be in the direction of movement of the control stick.

In order to provide an outside covering for the tiltable part of the rotor that will properly join the covering of the main craft in all tilted positions thereof the portions of the rotor covering which comes in the vicinity of the main covering should be in the form of a surface of revolution about the axis of pins 24. In the present instance it is illustrated as being in the form of a sphere 170 having as its center the point where the axis of pins 26 intersects the axis of rotor shaft 33. This spherical covering extends down far enough to join the covering of the fuselage 10 at all times, but has a sufficiently large opening through the bottom portion of the sphere to admit the frame and drive members in all tilted positions of the rotor.

With a craft constructed as outlined above the power driven rotor 11 adjusted in the solid line positions of Figure 1 may be used for supporting the craft during take-off, landing, hovering, vertical climb or descent, and very slow horizontal travel, all as well known in helicopters and as described in the various copending applications hereinbefore referred to. During these maneuvers the center of gravity of the craft will be substantially directly below the rotor center and the craft will assume approximately the attitude in which it is illustrated in Figure 1.

When it is desired to gain high forward speed, however, the rotor 11 may be gradually tilted forward toward the position indicated by dotted lines 11a in Figure 1, which will result in a tilting forward of the craft until under normal cruising conditions the line joining the center of airscrew 11 with the horizontal tail surfaces lies approximately horizontal. This amount of tilt added to the angle through which the rotor is displaceable relative to the craft brings the axis of the airscrew almost parallel with the direction of advance of the craft. During this tilting the wing is gradually tilted upward relative to the craft both to compensate for the tilting of the craft, and to bring the wing to an angle of incidence at which it may most effectively assume substantially the entire lift of the craft. The fact that this lift is acting on a line forward of the center of gravity of the craft prevents the thrust of the airscrew from producing excessive tilt of the craft.

In order to realize the full speed advantages that this arrangement makes possible the wings should be kept down to an area capable of supporting the craft only at a minimum speed and/or maximum wing loading much higher than the speeds and wing loadings ordinarily acceptable for take-off and landing. The distinctive speed advantages of the craft actually commence to be outstanding at wing areas corresponding to minimum sustentation speeds commencing at approximately the maximum of present take-off speeds, for instance at minimum sustentation speeds of at least 100 miles per hour, but the minimum sustenation speeds need not be limited to speeds of this approximate amount, but may be increased by any amount that the craft design, as particularly dictated by the power per unit of weight, may permit. In my craft it is therefore possible to take off and land at zero speeds and still it is possible to cruise at speeds which in the ordinary airplane could only be obtained by accepting take-off and landing speeds in excess of 100 miles per hour. Likewise the load per unit of wing area may be calculated without reference to landing and take-off conditions in designing the wings 12, it being possible to accept any wing loading which is sustainable at cruising speed.

A further advantage that my craft presents as compared with the ordinary airplane is that of providing a very much larger effective propeller diameter. The present invention makes it possible to utilize for propulsion of an airplane an immensely larger airscrew than could possibly be considered, were it not for the novel manner of raising the airscrew out of its propulsion position during take-off and landing, and therefore exceptional propeller efficiency becomes obtainable when the large airscrew is operating in its cruising attitude.

I claim:

1. In an aircraft the combination of a rotor adapted to sustain the craft in vertical flight, said rotor comprising a power driven shaft and a plurality of blades attached thereto in a manner permitting alteration of blade pitch, wings adapted to sustain the craft in other than vertical flight, means for altering the relative proportions of craft load carried by the rotor and by the wings comprising mechanism for displacing the shaft of the rotor about an axis extending generally transversely of the craft, means uniformly operable in all displaced positions of the rotor shaft for selectively adjusting the pitch of said blades comprising mechanism including a member movable along the axis about which displacement of the rotor shaft takes place, for simultaneously varying the pitch of all of said blades and mechanism including a second member independently movable along said axis for cyclically varying the pitch of each of said blades.

2. In an aircraft the combination of a rotor adapted to sustain the craft in vertical flight, said rotor comprising a power driven shaft and a plurality of blades attached thereto in a manner permitting alteration of blade pitch, wings adapted to sustain the craft in other than vertical flight, means for altering the relative proportions of craft load carried by the rotor and by the wings comprising mechanism for displacing the shaft of the rotor about an axis extending generally transversely of the craft, means uniformly operable in all displaced positions of the rotor shaft for cyclically varying the pitch of each of said blades and thereby altering the direction of the resultant force of said blades on said craft, said means comprising a transmission member displaceable about an axis and adapted thereby to produce a cyclic variation of pitch producing a shift in said resultant force in a direction making a fixed angle with respect to said last mentioned axis, a manually displaceable member, an intermediate control member so disposed as to be moved in response to the component of movement of said manually displaceable member in the said direction with respect to the axis with respect to which such cyclic variation of pitch is effected, a control member rockable about an axis disposed at an angle equal to said predetermined fixed angle, and means actuated by said control member for actuating said transmission member.

3. In an aircraft the combination of a rotor adapted to sustain the craft in vertical flight, said rotor comprising a power driven shaft and a plurality of blades attached thereto in a manner permitting alteration of blade pitch, wings adapted to sustain the craft in other than vertical flight, means for altering the relative proportions of craft load carried by the rotor and by the wings comprising mechanism for angularly displacing the shaft of the rotor relative to the craft in a plane substantially longitudinal of the craft, and means uniformly operable in all displaced positions of the rotor shaft for selectively adjusting the pitch of the blades; said pitch adjusting means comprising means for simultaneously altering pitch similarly on all blades and independently operable means for cyclically varying pitch differentially on the respective blades.

4. In an aircraft the combination of a rotor adapted to sustain the craft in vertical flight, said rotor comprising a power driven shaft and a plurality of blades attached thereto in a manner permitting alteration of blade pitch, wings adapted to sustain the craft in other than vertical flight, means for altering the relative proportions of craft load carried by the rotor and by the wings comprising mechanism for displacing the shaft of the rotor about a pivotal mounting extending generally transversely of the craft, means uniformly operable in all displaced positions of the rotor shaft for selectively adjusting the pitch of said blades comprising mechanism including a first member mounted co-axially with said pivotal mounting for simultaneously varying the pitch of all of said blades and a second member also mounted co-axially with said pivotal mounting and movable independently of said first member for cyclically varying the pitch of each of said blades.

5. The invention defined in claim 4 in combination with a third member also mounted co-axially with said pivotal mounting and movable independently of said first and second members for cyclically varying the pitch of each of said blades in a cyclic pattern differing from that characteristic of the cyclic variation produced by said second member.

6. In an aircraft the combination of an airscrew adapted to sustain the craft in vertical flight, means for angularly displacing the rotational axis of the airscrew relative to the craft in a plane substantially longitudinal of the craft through a range of positions including a vertical flight position in which said axis is substantially perpendicular to the longitudinal axis of the craft, wings adapted to sustain the craft in other than vertical flight, means for angularly displacing the wings relative to the craft, and a connection between said two displacing means for causing the respective angular displacements of the airscrew and the wings relative to the craft to take place simultaneously and to be respectively opposite in direction and different in angular amounts.

7. In an aircraft the combination of a sustaining rotor comprising a power driven shaft and a plurality of blades attached thereto in a manner permitting alteration of blade pitch, mechanism for displacing the shaft of the rotor about an axis extending generally transversely of the craft, adjustment means co-axial with said axis for cyclically varying the pitch of each of said blades, said means comprising two members, one selectively displaceable relative to the craft and the other correspondingly displaceable relative to the axis of the rotor shaft, and a substantially rigid member interconnecting said two members; a universally displaceable member, a control member, means connecting said universally displaceable member to said control member to transmit to the control member the component of the movement of the universally displaceable member in a direction making an acute angle with the longitudinal axis of the craft, and means actuated by said control member for actuating said adjustment means.

HAROLD T. AVERY.

REFERENCES CITED

The following references are of record in the file of this patent:

UNITED STATES PATENTS

| Number | Name | Date |
| --- | --- | --- |
| 1,865,744 | Cornelius | July 5, 1932 |
| 1,951,817 | Blount | Mar. 20, 1934 |
| 2,230,370 | Baynes | Feb. 4, 1941 |
| 2,284,902 | Hosford | June 2, 1942 |
| 2,321,572 | Campbell | June 15, 1943 |
| 2,352,342 | Pitcairn | June 27, 1944 |
| 2,352,404 | Pitcairn | June 27, 1944 |
| 2,376,523 | Synnestvedt | May 22, 1945 |

FOREIGN PATENTS

| Number | Country | Date |
| --- | --- | --- |
| 810,054 | France | Mar. 15, 1937 |